J. JONES.
TOASTER.
APPLICATION FILED DEC. 18, 1918.
1,300,975.
Patented Apr. 15, 1919.
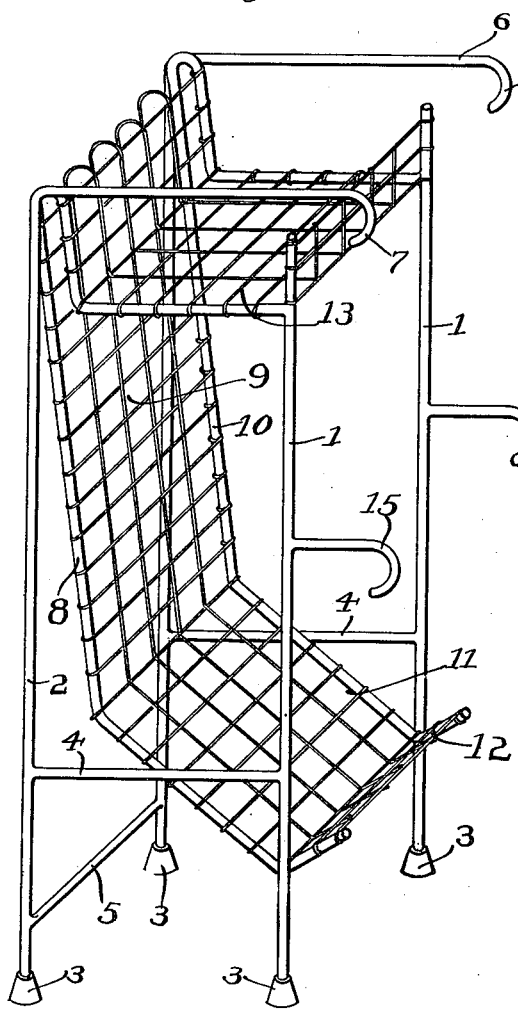
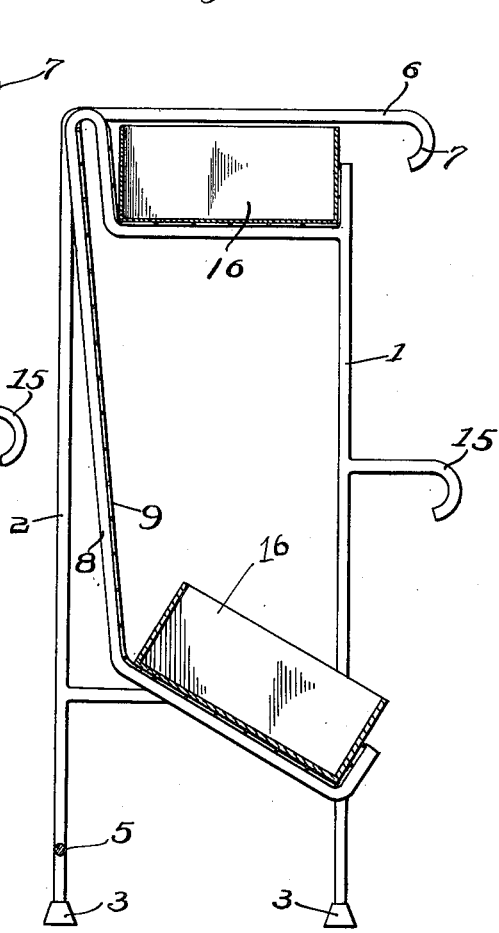
Witnesses
R. A. Thomas.
Inventor
Jennie Jones.
By Victor J. Evans
Attorney

UNITED STATES PATENT OFFICE.

JENNIE JONES, OF WINCHESTER, KENTUCKY.

TOASTER.

1,300,975.  Specification of Letters Patent.  Patented Apr. 15, 1919.

Application filed December 18, 1918. Serial No. 267,327.

*To all whom it may concern:*

Be it known that I, JENNIE JONES, a citizen of the United States, residing at Winchester, in the county of Clark and State of Kentucky, have invented new and useful Improvements in Toasters, of which the following is a specification.

This invention relates to toasters and it consists in the novel features hereinafter described and claimed.

An object of the invention is to provide a toaster of simple structure adapted to be applied to the grate of a coal stove or the gas supply pipe of a gas stove and adapted to hold slices of bread in a manner that they may be readily toasted.

In the accompanying drawings:—

Figure 1 is a perspective view of the toaster.

Fig. 2 is a vertical sectional view.

The toaster comprises a frame which consists of uprights 1 and 2. These uprights are provided at their lower ends with pedestals 3 whereby they may be supported upon a lever or plain surface. The uprights 1 are located at the front portion of the toaster and the uprights 2 at the rear portion thereof. Side bars 4 connect the uprights 1 and 2 together at points between their ends. The uprights 2 are connected together by a bar 5. The upper portions of the uprights 2 are forwardly extended over the upper ends of the uprights 1 and spaced from the same as at 6 and the extremities of the portions 6 are provided with hooks 7. The hooks 7 may be engaged over the pipe of a gas stove when the device is used in conjunction with such stove. A frame 8 is connected with the uprights 1 and 2 and carries a wire screen 9. The screen and frame are formed with an inclined intermediate portion 10, and a lower inclined portion 11 which is provided at its lower end with a ledge 12. The inclined portion 10 extends into a horizontally disposed portion 13.

Hooks 15 are provided upon the uprights 1 and may be engaged with the frame of a grate when the device is used in conjunction with a coal stove. The portions 10 and 11 may support slices of toast during the toasting operation and the portion 13 may support the slices after they have been toasted.

When it is desired to use the device for cooking potatoes or the like pans 16 may be placed upon the bars 4 and the angularly disposed portions 6 of the uprights 2. These pans may contain a certain amount of grease or fat and the potatoes may be broiled or cooked therein.

Having described the invention what is claimed is:—

1. A toaster comprising uprights, bars connecting the uprights together, said uprights being arranged into sets, one set being located at the forward portion of the toaster, the other set at the rear portion of the toaster, the rear bars having angularly disposed portions which extend over the upper ends of the forward bars and spaced therefrom, said angularly disposed portions being provided with hooks arranged in advance of the frame, and a frame supported by the uprights and carrying a wire screen.

2. A toaster comprising uprights, means for connecting them with a stove, a frame carried by the uprights and having an intermediate angularly disposed portion, a lower angularly disposed portion and a ledge provided at the lower edge of the last mentioned portion, there being provided at the upper portion of the frame a horizontally disposed basket like portion.

3. A device of the class described comprising uprights arranged in spaced pairs, a frame carried by one pair and lying between all of said uprights, said frame including vertically disposed inclined portions and a horizontally disposed basket like portion, a ledge formed on the lowermost inclined portion, and a wire fabric carried by said frame.

4. A device of the class described comprising spaced uprights arranged in pairs, one pair having their upper extremities extended horizontally to provide hooks arranged in advance of the other pair, a frame carried by the last mentioned pair of uprights and lying between all of said uprights, wire fabric covering the frame, and hooks projecting from the frame carrying uprights and arranged in vertical alinement with the first mentioned hooks.

5. A device of the class described comprising spaced uprights arranged in pairs, one pair having their upper extremities extended horizontally to provide hooks arranged in advance of the other pair, a frame carried by the last mentioned pair of uprights, said frame including vertically disposed inclined portions, and a basket like portion disposed immediately beneath said horizontal extremity of the first mentioned uprights, a ledge formed on the lowermost inclined portion of the frame, and wire fabric covering said frame.

In testimony whereof I affix my signature.

Mrs. JENNIE JONES.